UNITED STATES PATENT OFFICE.

THOMAS LEOPOLD WILLSON AND MAXIMILIAN MATTHEUS HAFF, OF OTTAWA, ONTARIO, CANADA; SAID HAFF ASSIGNOR TO SAID WILLSON.

METHOD OF MANUFACTURING DOUBLE SUPERPHOSPHATE.

1,078,887.  Specification of Letters Patent.  Patented Nov. 18, 1913.

No Drawing.  Application filed June 23, 1913.  Serial No. 775,436.

*To all whom it may concern:*

Be it known that we, THOMAS LEOPOLD WILLSON and MAXIMILIAN MATTHEUS HAFF, of the city of Ottawa, Province of Ontario, Dominion of Canada, have invented certain new and useful Improvements in Methods of Manufacturing Double Superphosphate, of which the following is the specification.

This invention relates to an improved method of manufacturing double superphosphate such as monocalcium phosphate.

The objects of the invention are to produce a dry product, to reduce the amount of insoluble matter and lessen the quantity of free phosphoric acid in the mixture.

The usual method of manufacturing double superphosphate is to add the commercial quality phosphoric acid to a natural phosphate rock. The phosphoric acid used in this reaction is usually manufactured by adding sulfuric acid to natural or bone phosphate and is known to be composed solely of ortho-phosphoric acid. The addition of this produces a product which is naturally moist and which cannot be handled and distributed for fertilizing purposes without further artificial drying treatment. We have discovered that if the ordinary ortho-phosphoric acid of commerce in this process be replaced by pyro-phosphoric acid, then a new and naturally dry product may be obtained and the apparent solvent action of the acid is materially increased.

The solution of pyro-phosphoric acid for the process may be produced by boiling ordinary phosphoric acid to a temperature of from 209 to 220 degrees centigrade. It may also be produced directly by heating natural phosphate rock with silicious material in the electric furnace. The phosphoric acid expelled from the furnace will be found to be of the meta variety, and it may be necessary to boil a solution of it to bring it to the pyro state.

In carrying out the process in practice a solution containing pyro-phosphoric acid however obtained is brought to a specific gravity of about 1.5 and added to natural phosphate rock, and mixed therewith in suitable proportions to produce double superphosphate in the manner at present carried out with ordinary commercial phosphoric acid.

It will be found that the mixture of natural phosphate with the pyro-phosphoric acid will quickly "set" in a cake like plaster which may readily be broken or disintegrated. This phenomena of "setting" is believed to be quite new in this process as commercially carried out and indicates that the double superphosphate product produced is inherently or naturally dry. This natural dryness which is not lost by exposure, renders the new product very useful as a fertilizer and gives it the important advantage over ordinary double superphosphate that it is not necessary to artificially dry it prior to use as a fertilizer. It is also found that about 15% more rock than usual may be added without materially increasing the amount of insoluble material in the resultant double superphosphate, apparently due to the greater solvent action of the pyro-phosphoric acid. There is a lesser quantity of free $P_2O_5$ in the resultant mass. Experiments have shown that the amount of free $P_2O_5$ in the resultant mass prepared as above indicated is about 3% as compared with six to eight per cent. in the double superphosphate of commerce.

The term "set" employed herein as applied to double superphosphate is used to describe a double superphosphate which in the process of manufacture has been set like plaster, and is therefore naturally dry.

While it has been stated that a solution of pyro-phosphoric acid is used in the process, this term is to be understood to include a solution which only partially consists of pyro-phosphoric acid and which may contain the ortho or meta varieties as well.

What we claim as our invention is:

1. The herein described method of manufacturing superphosphates which comprises adding pyro-phosphoric acid to natural phosphate rock.

2. As a new article of manufacture, normally dry double superphosphate.

3. As a new article of manufacture, normally dry and set double superphosphate.

In witness whereof we have hereunto set our hands in the presence of two witnesses.

THOMAS LEOPOLD WILLSON.
MAXIMILIAN MATTHEUS HAFF.

Witnesses:
RUSSEL S. SMART,
M. MAHONEY.